(12) United States Patent
Chaput et al.

(10) Patent No.: US 6,476,758 B1
(45) Date of Patent: Nov. 5, 2002

(54) FLEXIBLE DIGITAL RANGING SYSTEM AND METHOD

(75) Inventors: Christopher Chaput, Palo Alto; Kenneth Ehlers, Mountain View; Robert Pierson, Sunnyvale; David Rowe, San Jose; Jackson Ma, San Francisco, all of CA (US)

(73) Assignee: Lockheed Martin Corporation, Bethesda, MD (US)

( * ) Notice: Subject to any disclaimer, the term of this patent is extended or adjusted under 35 U.S.C. 154(b) by 29 days.

(21) Appl. No.: 09/799,890

(22) Filed: Mar. 6, 2001

(51) Int. Cl.$^7$ ............................................... G01S 13/08
(52) U.S. Cl. ...................... 342/118; 342/125; 342/135; 342/137; 342/145
(58) Field of Search ................................. 342/118, 120, 342/123, 125, 126, 127, 132, 134, 135, 137, 145, 189, 192, 193, 195, 196

(56) References Cited

U.S. PATENT DOCUMENTS

| | | | | |
|---|---|---|---|---|
| 4,839,656 A | * | 6/1989 | O'Neill et al. | 342/357.01 |
| 4,912,475 A | * | 3/1990 | Counselman, III | 342/352 |
| 4,965,586 A | * | 10/1990 | O'Neill et al. | 342/357.17 |
| 6,138,261 A | * | 10/2000 | Wilcoxson et al. | 714/755 |
| 2001/0030994 A1 | * | 10/2001 | Gunzelmann et al. | 375/150 |
| 2001/0053699 A1 | * | 12/2001 | McCrady et al. | 455/513 |
| 2002/0057217 A1 | * | 5/2002 | Milnes et al. | 342/357.07 |

OTHER PUBLICATIONS

"Spread–spectrum ranging multipath model validation", Braasch, M.S.; DiBenedetto, M.F., Aerospace and Electronic Systems, IEEE Transactions on, vol. 37, Issue: 1, Jan. 2001, pp. 298–304.*

* cited by examiner

Primary Examiner—John B. Sotomayor
(74) Attorney, Agent, or Firm—Kenneth W. Float

(57) ABSTRACT

Systems and methods that may be used to determine the distance between an orbiting satellite and a ground station. A master clock divider circuit generates clock signals derived from a master clock. A transmit code generation circuit generates pseudo-random number codes and processes the pseudo-random number codes to produce a composite signal having positive and negative correlation peaks that is transmitted to the satellite as an analog signal. A digitizing circuit receives the analog signal transmitted from the satellite, and digitizes the analog signal. A frequency domain matched filter match filters the digitized analog signal to produce correlation peaks contained in the digitized analog signal. A central processing unit comprises a middle code software matched filter that generates an outer code bit, and computes the distance from the ground station to the satellite by calculating the difference between the time that the composite signal was received compared to the time that the composite signal was transmitted and dividing the difference value by the speed of light, and comprises an outer code software matched filter that produces a bit error rate signal indicative of the validity of the computed range value.

12 Claims, 4 Drawing Sheets

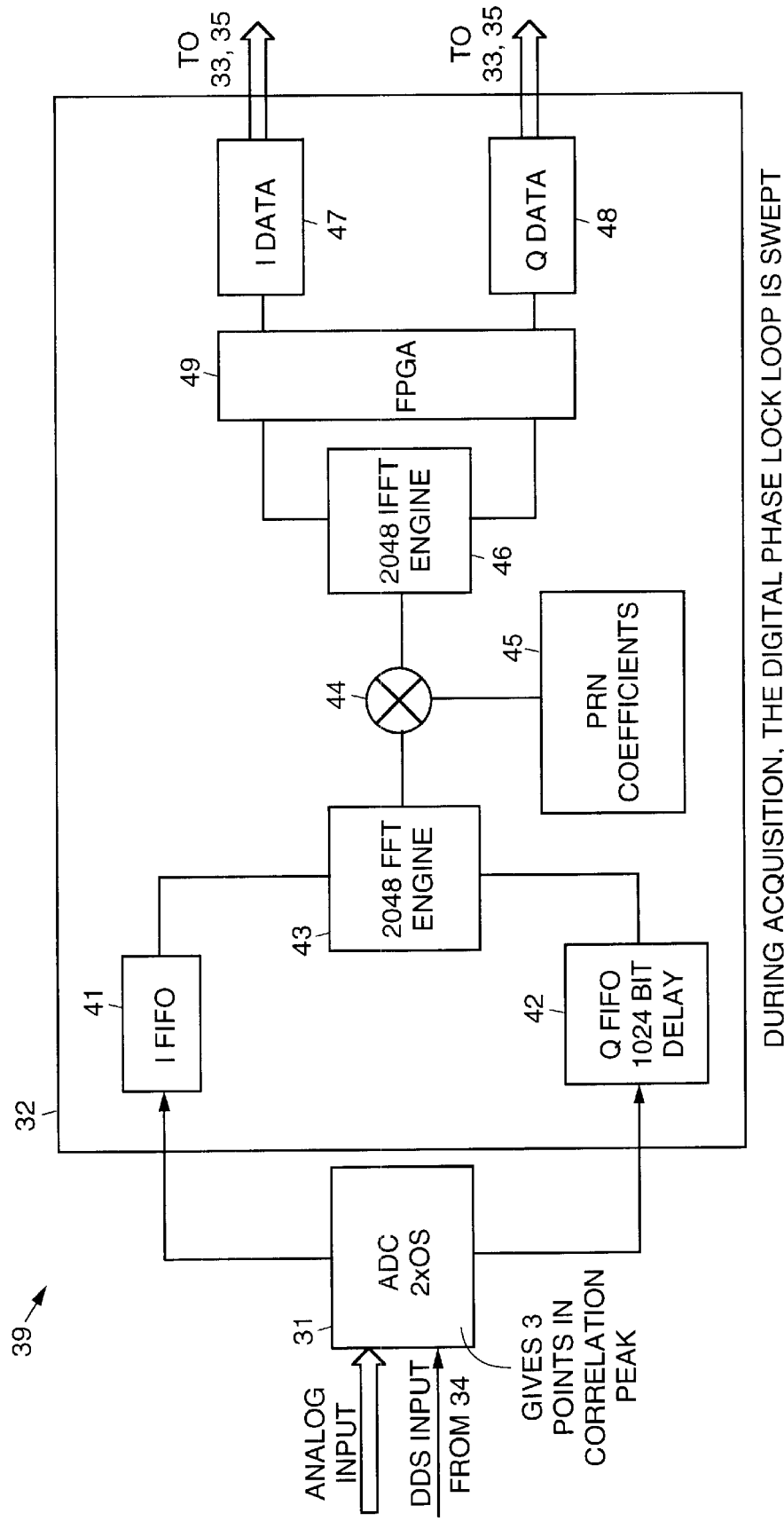

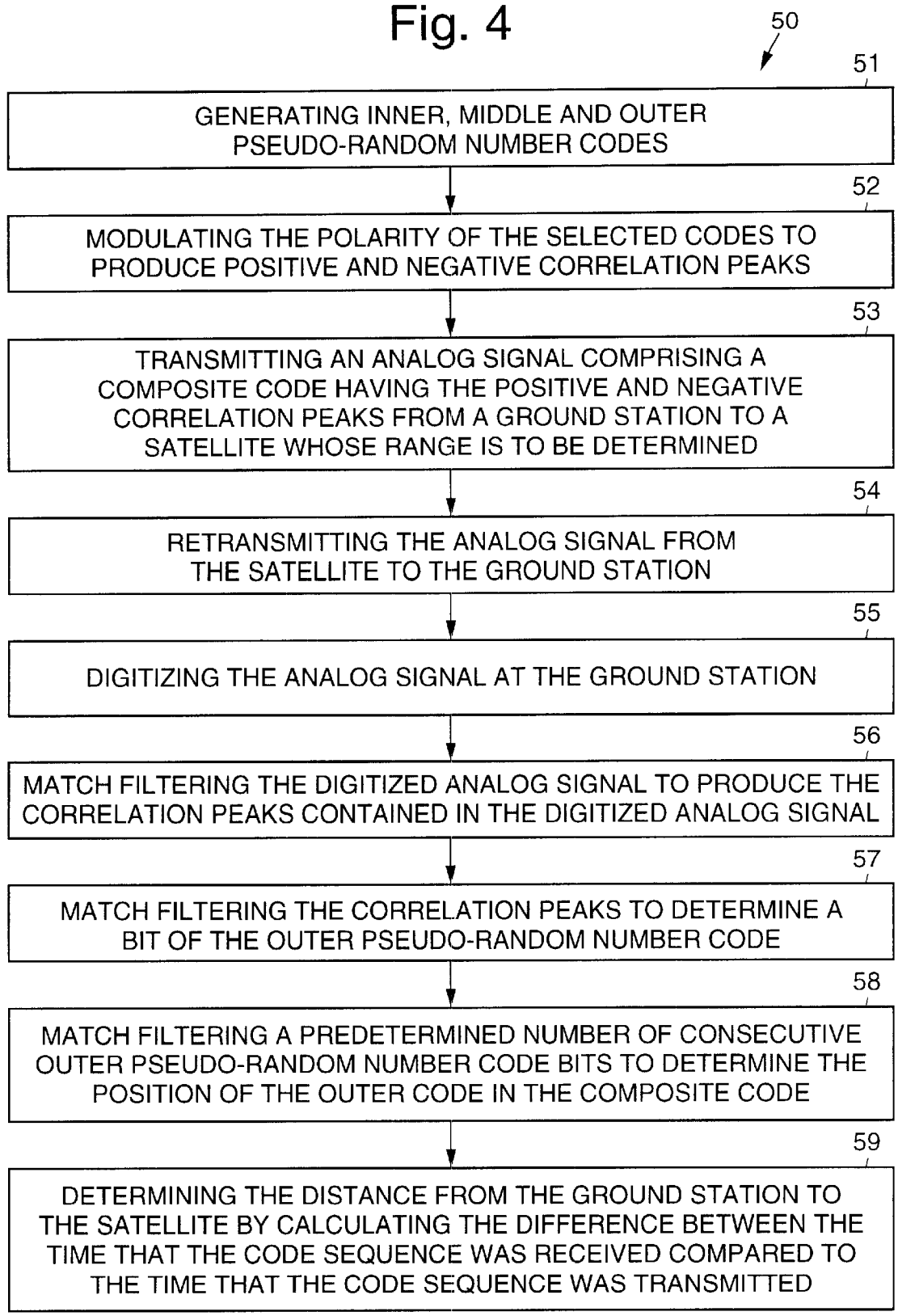

FLEXIBLE DIGITAL RANGING SYSTEM AND METHOD

BACKGROUND

The present invention relates generally to satellites, and more particularly to systems and methods used to determine the distance between an orbiting satellite and a ground station.

The assignee of the present invention develops the system architecture of satellite ground stations. The assignee also designs and constructs electronic circuits that communicate with satellites found in these ground stations. An important task of a ground station is to maintain the orbit of satellites. A necessary parameter used to maintain a satellite's orbit is its altitude. A satellite's altitude is commonly derived from measuring the distance or range a satellite is from the ground station. It is often necessary to determine the distance a satellite is from a ground station. The assignee of the present invention has developed an improved method for use in determining satellite range from a ground station.

Heretofore, the assignee of the present invention has used a technique that employs a method that is slow, un-flexible, introduces spurious signals, and provides the user with no quality factor, i.e., a measure of the certainty of its range number. This method is slow because it employs a single correlator that shifts and dwells through entire code sequences. It is un-flexible because it uses only two fixed code lengths. Introduces spurious signals because the final code sequences are composed of a series of short code sequences. Finally, it provides a range value without an accurate assessment of how certain the range value is.

In both methods (new and the old), the distance (range) to the satellite from a ground station is determined as follows. The ranging equipment constructs a long binary PRN digital ranging code. An important property of this code is that it does not repeat in the time required for it to be sent and subsequently received. This PRN ranging code is then modulated by uplink telemetry system at the ground station onto a carrier which is then transmitted to the satellite. This signal is then echoed back (retransmitted) to the ground station by the satellite. The received ranging signal is then routed via a downlink telemetry system to a receiver portion of the ranging equipment. Because the ranging signal is corrupted by noise and distorted by Doppler, a correlation process is performed. The correlation process multiplies the received PRN ranging code with a clean delayed version of the transmitted PRN ranging code. When the value of the delay is correct a large output of the correlator is observed (a correlation peak). When the value of the delay is not correct, the correlator yields a small signal value, or no correlation peak. The correct delay is equal to the time of flight of the signal. The distance to the satellite can be calculated based on this delay.

While the basic method of sending and then correlating the returned signal is the same for the old and new methods, it is the construction of the transmitted code and how the received signal is processed that differentiates them. It would therefore be desirable, and it is an objective of the present invention to provide improved systems and methods that determine the distance between an orbiting satellite and a ground station.

SUMMARY OF THE INVENTION

To accomplish the above and other objectives, the present invention provides for systems and methods that may be used to determine the distance between an orbiting satellite and a ground station. The present invention accomplishes this by (1) using a final PRN ranging code sequence that is a composite of three long PRN codes; (2) Simultaneously correlating the inner and middle code sequences; (3) Correlating a subset of the outer code; and (4) Deriving a quality value of the range number based on a running bit error rate (BER) on the outer code.

The advantages of using three long PRN codes to construct the final ranging code are flexibility, reduced processing time, and a spurious free composite signal. Flexibility is achieved by custom tailoring the lengths of the inner, middle, and outer codes for the specific orbit and signal power requirements of the ground station and the satellite. By simultaneously correlating the inner and middle codes the speed of the ranging process is greatly enhanced. Correlating a subset of the outer code further reduces the acquisition time. A spurious free ranging signal is derived from the property that long PRN codes evenly spread their energy across the frequency spectral band. Thus when the ranging signal is combined with other telemetry signals it does not have spurious content that could cause interference. The bit sequence of the outer code is unique, any errors are easily monitored. A running bit error rate based on the number of errors found in the outer code is the basis for a measure of the confidence factor the ranging unit assigns to the range number.

An exemplary system comprises a custom circuit board (or card assembly) and a central processing unit (CPU). The custom circuit board includes seven main sub-circuits. These sub-circuits include a master clock divider circuit, a transmit code generation circuit, a time tag circuit, a digitizing circuit, a digital synthesizer circuit, a matched filter circuit, and a field programmable gate array (FPGA) integrated circuit.

The master clock divider circuit supplies the custom circuit board with all the necessary clocks at the correct frequency and phase. The function of the transmit code generator circuit is to construct a final PRN ranging code. The time tag circuit marks the arrival time of each complete inner code cycle.

The received signal is digitized by an Analog to Digital Converter (ADC). The received signal is a composite signal that contains the PRN ranging signal and telemetry signals that are corrupted by noise and contain a Doppler offset and/or shift. The digital synthesizer circuit is used to acquire the received signal ensuring the ADC yields coherent samples. A frequency domain matched filter processes the digitized analog signal to produce the inner code correlation peaks. The FPGA circuit is used to select the correct data from the matched filter and transmit it to the central processing unit.

The central processing unit comprises a middle code software matched filter that generates an outer code bit. The final location of the received code is known once seven bits of the outer code are processed. The central processing unit computes the distance from the ground station to the satellite by calculating the difference between the time that the composite signal was received compared to the time that the composite signal was transmitted and dividing the difference value by the speed of light. The central processing unit also tracks any errors found in the outer code and produces a bit error rate signal indicative of the validity of the computed range value.

An exemplary method for determining the distance between an orbiting satellite and a ground station comprises the following steps. Inner, middle and outer pseudo-random number codes are generated. The PRN ranging code is the composite of the inner, middle, and outer codes. The PRN ranging code is then transmitted from a ground station to a satellite whose range is to be determined. The analog signal is retransmitted from the satellite to the ground station.

The analog signal is digitized at the ground station. The digitized analog signal is match filtered to produce inner code correlation peaks. The middle matched filter then performs a correlation process on the output of the inner matched filter. The middle code correlation peaks are match filtered to determine a bit of the outer pseudo-random number code. A predetermined number of consecutive outer pseudo-random number code bits are match filtered to determine the position of the outer code in the composite code. The distance from the ground station to the satellite is determined by calculating the difference between the time that the code sequence was received compared to the time that the code sequence was transmitted.

The present invention provides for simultaneous correlation of the entire inner and outer code sequence. The present invention incorporates a matched filter early/late gate that acts as a digital phase detector. The present invention has a flexible range code to adapt to varying orbit distances, low signal to noise ratio environments, Doppler shifts, and changing Doppler shifts. The present invention also uses an applied bit error rate algorithm to give a confidence value to the range number (using the outer code).

The present invention has the ability to optimize performance of system by changing (inner, middle, outer) code(s) to adapt to all types of satellite orbits. The present invention has reduced acquisition time by using a matched filter fast Fourier transform (FT) correlator engine to simultaneously correlate the entire inner and middle code sequence verses the currently-used architecture discussed in the Background section. The output spectrum generated by the present invention minimize s interference with other signals due to the fact that ranging power is spread over the entire bandwidth of operation, similar in concept to CDMA (carrier detect multiple access).

BRIEF DESCRIPTION OF THE DRAWINGS

The various features and advantages of the present invention may be more readily understood with reference to the following detailed description taken in conjunction with the accompanying drawing, wherein like reference numerals designate like structural elements, and in which:

FIG. 3 is a block diagram showing the architectural topology of the inner code matched filter correlator engine shown in FIG. 2; and FIG. 4 is a flow diagram showing an exemplary ranging method in accordance with the principles of the present invention.

DETAILED DESCRIPTION

Figure 1:
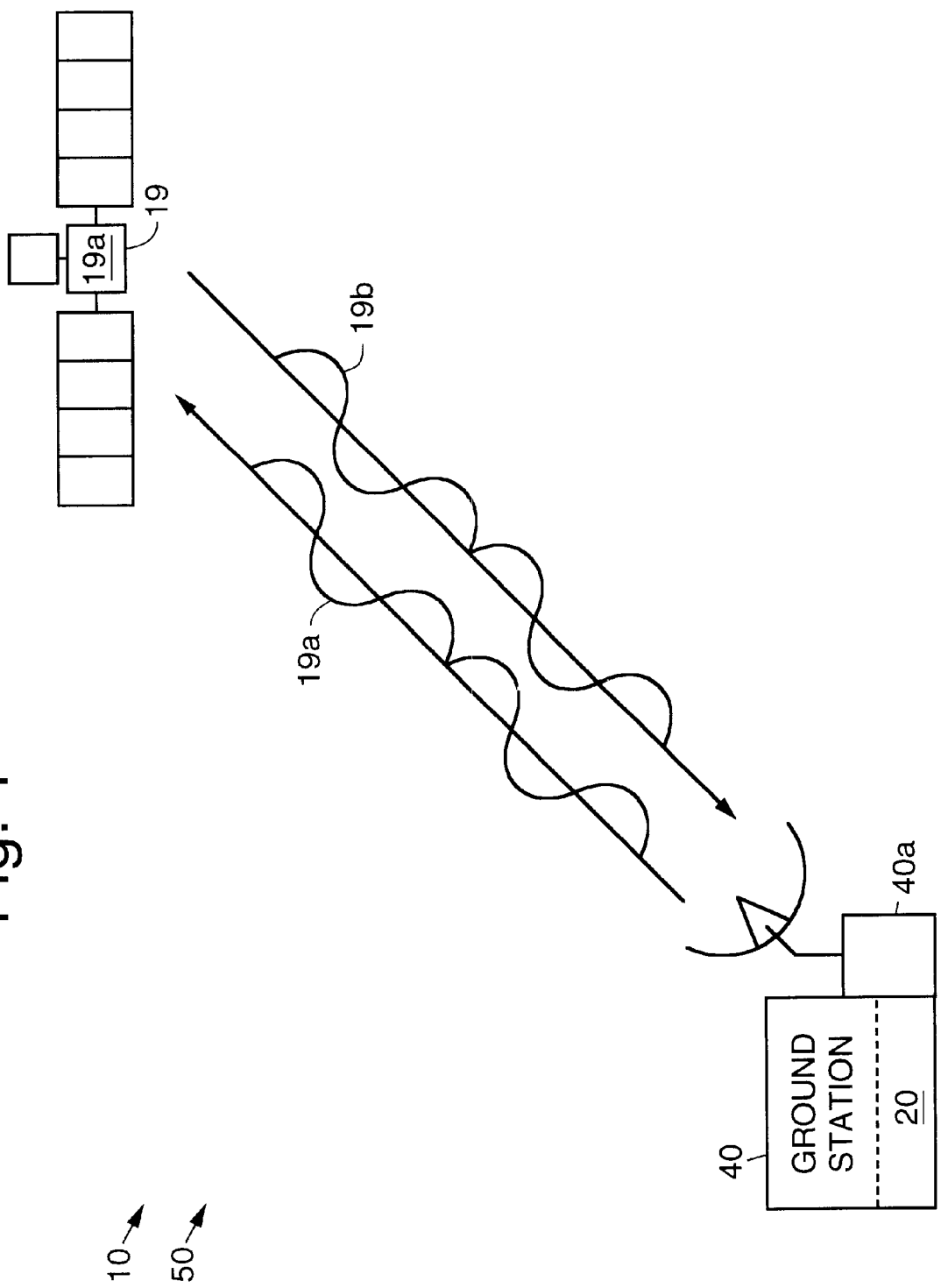
FIG. 1 shows the operating environment of ranging systems and methods in accordance with the principles of the present invention.

Referring to the drawing figures, FIG. 1 the operating environment of ranging systems 10 and methods 50 (FIG. 4) in accordance with the principles of the present invention, and provides a context for understanding the operation of the present invention. As is shown in FIG. 1, the ranging system 10 and method 50 are used to communicate from a ground station 40 by way of a satellite 19 back to the ground station 40 in order to determine the distance (range) to the satellite 19 from the ground station 40.

The ranging system 10 and method 50 is implemented using digital ranging equipment 20 in accordance with the principles of the present invention that is located at the ground station 40. The ranging system 10 comprises telemetry systems 40a and the digital ranging equipment 20 disposed at the ground station 40, and the satellite 19 and its communication systems 19a for receiving and returning the repeating modulated code sequence.

In general, the distance (range) to the satellite 19 from the ground station 40 may be determined as follows. The ground station 40 has telemetry systems 40a that communicate with the satellite 19 and send a repeating modulated code sequence 19a to the satellite 19. This repeating modulated code sequence 19a is then returned to the ground station 40 by the satellite 19. By calculating the time of flight of the signal that is transmitted and received by the ground station 40, the distance to the satellite 19 may be calculated.

To calculate the time of flight of the signal, the received signal 19b must be identical to the transmitted signal 19a. In most cases, the satellite 19 moves with respect to the ground station 40, and the received signal 19b will be shifted in frequency with respect to the transmitted signal 19a. This is due to Doppler frequency shifts. When the satellite 19 moves towards the ground station 40 it returns the signal 19b with a higher frequency, and when the satellite 19 moves away from the ground station 40 it returns the signal with a lower frequency. This Doppler shift must be removed at the ground station 40 before the time of flight of the signal can be accurately calculated.

Figure 2:
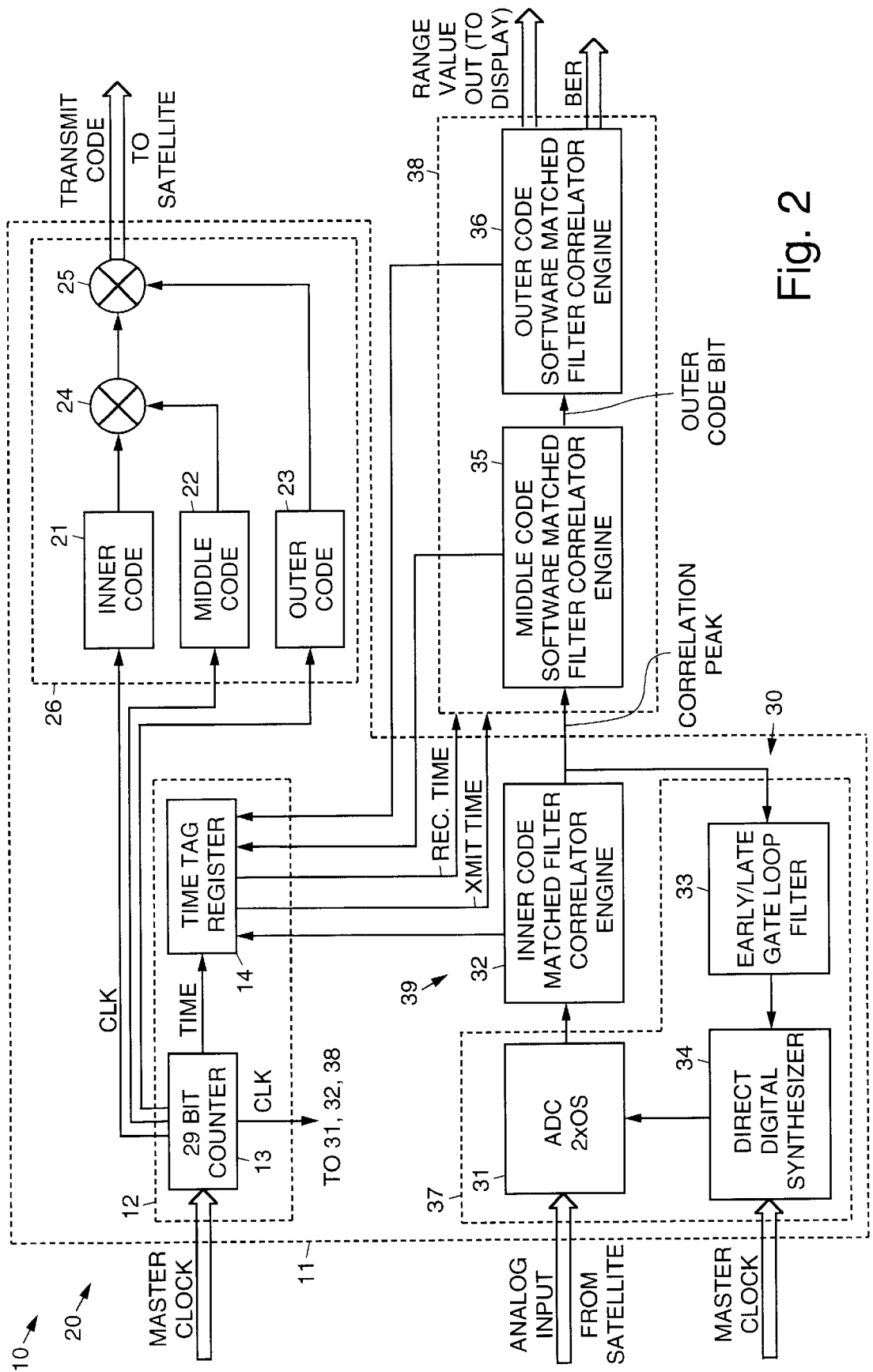
FIG. 2 is a block diagram showing the architectural topology of exemplar y digital ranging equipment in accordance with the principles of the present invention that may be used to implement the present digital ranging systems and methods.

FIG. 2 is a block diagram showing the architectural topology of exemplary digital ranging equipment 20 in accordance with the principles of the present invention that may be used in implementing the present ranging systems 10 and methods 50. The exemplary digital ranging equipment 20 comprises four major subsections, including a master clock divider circuit 12, a transmit code generation circuit 26, a digitizing circuit 37, and a digital matched filter processing chain 39 comprising a matched filter correlator engine 39.

The exemplary digital ranging equipment 20 may be fabricated as a custom circuit card assembly 11 and a central processing unit (CPU) 38. The custom circuit card assembly 11 performs computationally intensive generation and correlation of a pseudo-random number inner code. The CPU 38 performs correlation of middle and outer pseudo-random number codes in conjunction with time tag processing.

The master clock divider circuit 12 is comprised of a 29-bit counter 13 and a time tag register 14. The clock divider circuit 12 generates clock signals derived from a 64 MHz master clock, for example, that are used by the transmit-code generation circuit 26, the digitizing circuit 37, the digital matched filter processing chain 39, and the time tag register 14.

The time tag register 14 is triggered to hold the value of the counter 13 as each inner code sequence is received from the digital matched filter processing chain 39. The arrival time of the inner code sequence is then read by the CPU 38 and used in the range calculation. The counter 13 and time tag register 14 are 29 bits long, and any position of the entire code is uniquely identified and tagged. The 29-bit depth of the counter 13 and time tag register 14 is a sum of the required resolution and lengths of the three pseudo-random number codes.

The transmit code generation circuit 26 is comprised of three independent pseudo-random number (PRN) generators 21, 22, 23 comprising inner, middle and outer code generators 21, 22, 23, and first and second multipliers 24, 25. The three pseudo-random number generators 21, 22, 23 are driven by different outputs of the master clock divider circuit 12 such that the inner code generator 21 produces a $2^9$ pseudo-random number code at 1 Mbit/sec. The middle code generator 22 produces a $2^7$-bit pseudo-random number code where each bit is as long as the entire inner code. The outer code generator 23 produces a $2^7$-bit pseudo-random number code where each bit is as long as the entire middle code.

The outputs of the inner code and middle code generators 21, 22 are coupled to inputs of and are multiplied together in the first multiplier 24. The output of the first multiplier 24 and the output of the outer code generator 23 are coupled to inputs of and are multiplied together in the second multiplier 25. The net effect of this is that the middle code modulates the polarity of the inner code and the outer code modulates the polarity of the middle code. These polarity differences produce positive and negative correlation peaks, a property utilized in the matched filters 32, 35, 36 of the digital ranging system 10. This composite code is uplinked to the satellite 19 whose range is to be determined.

The digitizing circuit 37 comprises an analog-to-digital converter (ADC) 31 that coherently samples an analog baseband input received from the satellite 19 to create 16-bit digital samples. A direct digital synthesizer 34 provides a coherent sampling clock to the analog-to-digital converter 31. The 64 MHz master clock drives the direct digital synthesizer 34 and a software PLL loop filter 33 (early/late gate loop filter 33) sets the output frequency of the direct digital synthesizer 34. An anti-aliasing filter (not shown), located on the input to the analog to digital converter 31 may be used to limit the noise bandwidth and prevents images from corrupting the signal.

The analog-to-digital converter 31 oversamples the analog baseband input by a factor of 8. Decimating finite impulse response (FIR) filters comprising the matched filter processing chain 39) following the analog-to-digital converter 31 provide additional suppression of images and noise. The final sample rate of two samples per bit provides three points found in the correlation peak. Correlation peaks are the output of the matched filter processing chain 39.

The digital matched filter processing chain 39 comprises a frequency domain matched filter 39. The frequency domain matched filter 39 correlates or matches the $2^9$-bit pseudo-random number inner code pattern. The filter 39 has an overlap and select architecture that provides real time processing of the data. An exemplary hardware implementation of the frequency domain matched filter 39 is shown in FIG. 3 and is comprised of a 1024 sample deep first-in, first-out (FIFO) memory integrated circuit 41, 42 that provides overlap, five application specific integrated circuit (ASIC) chips, and a field programmable gate array (FPGA) integrated circuit 49. The ASIC chips are configured as a 2048 long complex fast Fourier transform (FFT) processor 43, a complex multiplier 44, 45, and a 2048 complex inverse FFT (IFFT) processor 46. The function of the field programmable gate array integrated circuit 49 is to select valid data and emulate a standard front panel data port (FPDP) data transfer protocol. The front panel data port allows the digital ranging equipment 20 to transfer the output data via the FPDP data protocol to the CPU 38. The output data (I data 47, Q data 48) is transferred in frames of 2048 samples of which there are six samples that comprise the two correlation peaks.

The functions of the CPU 38 include initial acquisition, tracking, range determination, and bit error rate (BER) calculation. Initial acquisition is done with only the inner code being transmitted. After processing by the inner code IFFT processor 46, the data is searched for a stable peak value. If none is found, the analog-to-digital converter 31 sample rate is adjusted and the search continues. Inherent in the data format is that the peak is composed of three points: a peak value, an early gate point and a late gate point. These points are derived from the two times over-sampled analog input (2×OS) produced by the analog-to-digital converter 31. The difference between the values of the early/late gate points ($\Delta_{EL}$) is the phase error. The early/late gate filter 33 sums $\Delta_{EL}$ twice to produce an integrated phase error ($\Phi$error), given by the equation:

$$\Phi_{error} = \sum_{m=0}^{M-1} \sum_{n=0}^{N-1} \Delta_{EL},$$

where M and N are adjusted to tune the parameters of the phase-locked loop 30 for different satellite orbits and noise environments. This architecture is similar to an analog loop filter.

$\Phi_{error}$ is related to the tune frequency of the clock of the analog-to-digital converter 31, and is given by the equation:

$$F_{tune} = \omega_0 + \omega_{doppler.n},$$

where $\omega_{doppler.n} = A(\omega_{doppler.n-1}) + B(\omega_{error})$ and A and B are constants. As acquisition continues $\omega_{error}$ is driven towards zero and the system 10 is considered to have locked onto the analog input signal.

While in tracking mode, which occurs after acquisition, the middle and outer code modulators 21, 23 are turned on. The inner code sequence is modulated by the middle and outer code sequences. This modulation affects the sign of the FFT correlation peaks. Previous values of the peaks are stored in an array for use by the middle code software FFT-based matched filter 35. An overlap and select FFT operation is performed to generate the middle code correlation peaks. This operation is similar to the overlap and select FFT operation performed on the received inner code analog-to-digital converter values except the length of FFT is 256 points instead of 2048 and Q values are delayed by 128 instead of 1024. The overlap and select FFT operations performed in the inner code matched filter correlator engine 32 and middle code software matched filter correlator engine 35 allow analysis of the continuous real time analog input signal.

Because the inner and middle codes were modulated by the outer code sequence in the second multiplier 25, the modulation affects the sign of the middle code matched filter correlation peaks. Middle code peaks are summed in 128 ($2^7$) blocks in the middle code software matched filter correlator engine 35 to determine the one bit of the outer code sequence.

Bit error rate (BER) is based on the property that once seven consecutive bits of the outer code sequence have been accumulated, the next seven bit sequence is known, and therefore any deviation from this known bit sequence implies a bit error. A continuous summing of the number of bit errors versus the total bits received is used to calculate the bit error rate in the outer code software matched filter correlator engine 36. This bit error rate is a direct indication of the validity of the computed range value and the overall health of the link between the satellite 19 and the ground station 40.

The range value is determined by calculating the difference between the time that the code sequence was received compared to the time that the code sequence was transmitted (and dividing the difference value by the speed of light). The CPU 38 calculates the range value by reading the recorded value in the time tag register 14, establishing the bit-position of the outer code, and knowing when the transmitted code was initially transmitted. The arrival time of the code sequence is recorded in the time tag register 14. The middle and outer codes transition on each complete inner code sequence. The inner code transition time provides the middle code, and the outer code transition process is expedited due to the inherent property of the pseudo-random number code. The location of the received position of the outer code sequence can be uniquely identified, since each seven-bit sequence occurs once in the entire outer code. This allows a range calculation to be performed once the first seven bits of the outer code sequence are processed. The time the code sequence was transmitted is calculated from the positions of the inner, middle and outer code sequences.

Referring to FIG. 4, it is a flow diagram showing an exemplary ranging method 50 in accordance with the principles of the present invention. The exemplary method 50 comprises the following steps.

Inner, middle and outer pseudo-random number codes are generated 51. The polarity of the selected codes are modulated 52 to produce positive and negative correlation peaks. An analog signal comprising a composite code having the positive and negative correlation peaks is transmitted 53 from a ground station 40 to a satellite 19 whose range is to be determined. The analog signal is retransmitted 54 from the satellite to the ground station.

The analog signal is digitized 55 at the ground station. The digitized analog signal is match filtered 56 to produce the correlation peaks contained in the digitized analog signal. The correlation peaks are match filtered 57 to determine a bit of the outer pseudo-random number code. A predetermined number of consecutive outer pseudo-random number code bits are match filtered 58 to determine the position of the outer code in the composite code. The distance from the ground station to the satellite is determined by calculating 59 the difference between the time that the code sequence was received compared to the time that the code sequence was transmitted.

Thus, systems and methods that determine the distance a satellite is from a ground station has been disclosed. It is to be understood that the above-described embodiments are merely illustrative of some of the many specific embodiments that represent applications of the principles of the present invention. Clearly, numerous and other arrangements can be readily devised by those skilled in the art without departing from the scope of the invention.

What is claimed is:

1. A ranging system for determining the distance between a satellite and a ground station, comprising:

a master clock divider circuit that generates clock signals derived from a master clock;

a transmit code generation circuit that is operative to receive clock signals from the master clock divider circuit, generate three pseudo-random number codes and process the pseudo-random number codes to produce a composite signal having positive and negative correlation peaks that is transmitted to the satellite as an analog signal;

a digitizing circuit that is operative to receive clock signals from the master clock divider circuit, receive the analog signal comprising the composite signal having positive and negative correlation peaks from the satellite, and digitize the analog signal comprising the composite signal;

a frequency domain matched filter that is operative to receive clock signals from the master clock divider circuit and match filter the digitized analog signal to produce correlation peaks contained in the digitized analog signal; and a central processing unit that comprises a middle code software matched filter that generates an outer code bit, that computes the distance from the ground station to the satellite by calculating the difference between the time that the composite signal was received compared to the time that the composite signal was transmitted and dividing the difference value by the speed of light, and that comprises an outer code software matched filter that produces a bit error rate signal indicative of the validity of the computed range value.

2. The system recited in claim 1 wherein the master clock divider circuit comprises a 29-bit counter and a time tag register.

3. The system recited in claim 2 wherein the 29-bit depth of the counter and time tag register is a sum of the required resolution and lengths of the three pseudo-random number codes.

4. The system recited in claim 1 wherein the time tag register is triggered to hold the value of the counter as each inner code sequence is received from the digital matched filter processing chain.

5. The system recited in claim 1 wherein the arrival time of the inner code sequence is then read by the central processing unit and used in the range calculation.

6. The system recited in claim 1 wherein the transmit code generation circuit comprises inner, middle and outer code pseudo-random number generators that are selectively coupled to first and second multipliers and that are driven by outputs of the master clock divider circuit such that the inner code generator produces a $2^9$ pseudo-random number code, the middle code generator produces a $2^7$-bit pseudo-random number code where each bit is as long as the entire inner code, and the outer code generator produces a $2^7$-bit pseudo-random number code where each bit is as long as the entire middle code.

7. The system recited in claim 5 wherein outputs of the inner code and middle code generators are coupled to inputs of and are multiplied together in the first multiplier, the output of the first multiplier and the output of the outer code generator are coupled to inputs of and are multiplied together in the second multiplier so that the middle code modulates the polarity of the inner code and the outer code modulates the polarity of the middle code to produce positive and negative correlation peaks.

8. The system recited in claim 1 wherein the transmit code generation circuit is operative to produces a composite code is uplinked to the satellite whose range is to be determined.

9. The system recited in claim 1 wherein the digitizing circuit comprises an analog-to-digital converter and a direct digital synthesizer.

10. The system recited in claim I wherein the frequency domain matched filter comprises:

a first-in, first-out memory;

a complex fast Fourier transform processor;

a complex multiplier;

a complex inverse fast Fourier transform processor; and a field programmable gate array integrated circuit.

11. The system recited in claim 1 wherein the field programmable gate array integrated circuit selects valid data and emulates a predetermined data transfer protocol.

12. A method for determining the distance between a satellite and a ground station, comprising the steps of:

generating inner, middle and outer pseudo-random number codes;

modulating the polarity of the selected codes to produce positive and negative correlation peaks;

transmitting an analog signal comprising a composite code having the positive and negative correlation peaks from a ground station to a satellite whose range is to be determined;

retransmitting the analog signal from the satellite to the ground station;

digitizing the analog signal at the ground station;

match filtering the digitized analog signal to produce the correlation peaks contained in the digitized analog signal;

match filtering the correlation peaks to determine a bit of the outer pseudo-random number code;

match filtering a predetermined number of consecutive outer pseudo-random number code bits to determine the position of the outer code in the composite code; and determining the distance from the ground station to the satellite by calculating 59 the difference between the time that the code sequence was received compared to the time that the code sequence was transmitted.

\* \* \* \* \*